Fig. 1

July 14, 1942.  W. R. MILLER  2,289,923
AIR-CONDITIONING SYSTEM
Filed Nov. 18, 1935  3 Sheets-Sheet 3

Fig. 3

Inventor
Wayland R. Miller
By George H. Fisher
Attorney

Patented July 14, 1942

2,289,923

UNITED STATES PATENT OFFICE 2,289,923

AIR-CONDITIONING SYSTEM

Wayland R. Miller, Chicago, Ill., assignor to Minneapolis-Honeywell Regulator Company, Minneapolis, Minn., a corporation of Delaware Application November 18, 1935, Serial No. 50,291

21 Claims. (Cl. 62—6)

The present invention relates to the art of air conditioning and is particularly concerned with the cooling and dehumidification of air. In order to obtain either a cooling action or a dehumidifying action, cooling of one type or another is necessary. In the case of cooling of air, it is only necessary to reduce the temperature of the air itself and to remove some of the superheat from the moisture present in the air, providing the ultimate desired temperature of the air is not too far below the dew-point thereof. In order to dehumidify air however, it is not only necessary to lower the temperature of the air as well as to remove superheat from the moisture contained therein, but it is also necessary to condense the moisture contained in the air by removing therefrom an amount of heat equal to the latent heat of vaporization. The amount of cooling necessary, therefore, to obtain a dehumidifying action is much greater than is necessary for a cooling action only and where dehumidification is not desired.

The present invention therefore contemplates varying the temperature of a cooling coil or coil over which the air to be conditioned is passed, in whole or in part, such variation being primarily controlled by the relative humidity in the space being controlled. In this manner, the amount of dehumidification obtained is varied. The present invention further contemplates controlling the temperature of the air in the space so as to maintain the desired temperature conditions therein.

One of the objects of the present invention, therefore, is the provision of an air conditioning system in which the temperature of a cooling coil or a plurality of cooling coils is varied as a result of fluctuations in the relative humidity of the space being controlled.

While it is desirable to maintain certain predetermined relative humidity conditions within a space, still the temperature of the space should be the dominating controlling factor. In the systems of the present invention, provision is therefore made to permit dominating control of the cooling means by the space temperature when the space temperature becomes excessive and irrespective of the value of the relative humidity therein.

A further object of the invention therefore is the provision of systems for varying the cooling effect to which the air to be conditioned is submitted, in accordance with variations in relative humidity, but in which the cooling effect is increased irrespective of the relative humidity conditions if the space temperature becomes excessive.

In one form of the invention, the temperature of a cooling coil used for air conditioning purposes is either maintained relatively high or relatively low dependent upon both the temperature and the relative humidity of the air in the space being controlled. In this form of the invention, the coil is maintained at the relatively low temperature whenever the relative humidity rises above some predetermined value and is operated at the relatively high temperature whenever the relative humidity of the space to be controlled is at an intermediate value. In addition, the temperature of the cooling coil is maintained at the relatively low value if the room temperature is excessive and irrespective of whether or not the relative humidity is high. Further, no cooling whatsoever can be obtained if the space temperature becomes too low.

It therefore follows that a further object of the invention is the provision of an air conditioning system in which a cooling coil is selectively operated at a relatively high temperature or at a relatively low temperature dependent upon whether cooling or dehumidification is primarily desired.

It is a further object of the invention to maintain a relatively low temperature of the cooling coil in the event the temperature of the space becomes excessive and to prevent any cooling if the space temperature becomes too low.

In a further modification of the invention, variable back pressures are maintained in a cooling coil in accordance with fluctuations in the relative humidity of a space being supplied with air from a conditioner in which the cooling coil forms a part. In this form of the invention, the temperature of such space is controlled by permitting more or less of the conditioned air to be diverted or by-passed around the cooling coil. Provision is also made to maintain a relatively low back pressure on the cooling coil in the event the room temperature becomes excessive. The variable back pressure is maintained on the cooling coil in this form of the invention by variably positioning a throttling valve which is located in the return pipe of the cooling coil. Control of the compression means for the refrigerating system that supplies the refrigerant to the cooling coil is then obtained by means responsive to the pressure in the return line between the throttling valve and the compressor.

Another object of the invention therefore is the provision of an air conditioning system in which variable amounts of dehumidification are obtained by varying the temperature of a cooling coil through the medium of a throttling valve which is located in the return line from the cooling coil.

An additional object of the invention is the controlling of such a throttling valve by the temperature of the space to be controlled in the event such temperature becomes excessive while normally controlling the temperature of the space by diverting or by-passing variable amounts of air around the cooling coil and delivering such by-passed air as well as the cooled air to the space.

Another object of the invention is the controlling of the refrigeration means in accordance with the pressure between a throttling valve located in the return line and the compression means.

In a still further form of the invention, control of the relative humidity of a space is affected by maintaining variable back pressures in a refrigeration system upon fluctuations in the relative humidity of the space, such variable back pressures being obtained by directly controlling the refrigerating means or compression system in accordance with the back pressure in the system and varying the standard of the back pressure thus maintained upon fluctuations in relative humidity. In this form of the invention, control of the temperature is obtained by rendering varying numbers of cooling coils operative and, under excessive temperature conditions, by maintaining a low back pressure in the refrigeration system irrespective of the value of the relative humidity. Also, in this form of the invention, no cooling or dehumidification can take place if the space temperature becomes too low.

A further object of the invention therefore is the provision of an air conditioning system in which the number of cooling coils in operation is varied according to the temperature of a space being controlled and in which the temperature of the cooling coils is varied in accordance with fluctuations in relative humidity in the space.

Other objects of the invention will be found in the drawings, the detailed description and the appended claims.

For a more complete understanding of the invention, reference may be had to the following detailed description and the accompanying drawings, in which.

Figure 1:
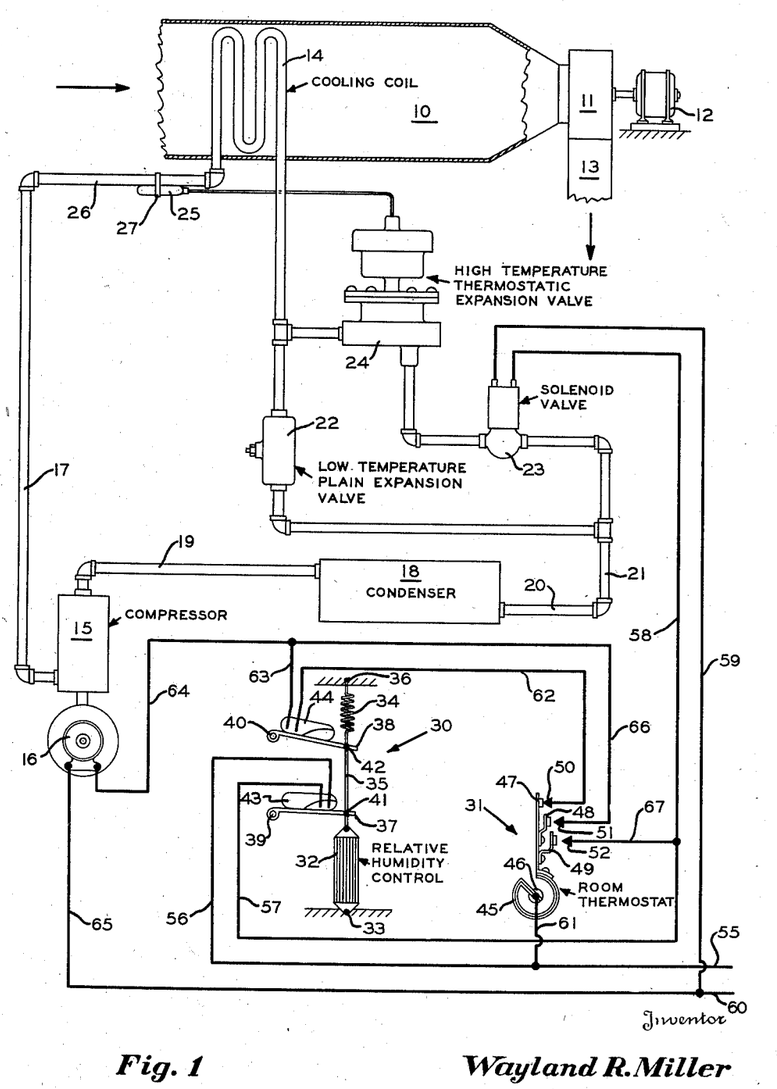
Fig. 1 discloses one system constructed in accordance with the present invention wherein the temperature of a cooling coil is maintained either at a relatively high value or at a relatively low value, depending upon the temperature and relative humidity conditions of a space to be controlled.

Referring first to Fig. 1, the air to be conditioned is passed through an air conditioning chamber 10 by means of a fan 11 which may be driven in any suitable manner, as by the electric motor 12. This air is then passed to the room or space to be conditioned by means of a duct 13. The air passing through the air conditioning chamber 10 may be cooled and dehumidified in any desirable manner and, in the present embodiment of the invention, such cooling and dehumidification is shown as being accomplished by means of a cooling coil 14, located in the air conditioning chamber 10, which cooling coil is adapted to be supplied with refrigerant by a suitable mechanical refrigeration system.

This refrigeration system includes a compressor 15 that is driven by an electric motor 16. Refrigerant is returned from the coil 14 to the compressor 15 by means of a pipe 17. This refrigerant is thereupon compressed after which it is passed to a condenser 18 by means of a pipe 19. The condenser 18 may be of any of the well-known types and operates to liquify the compressed gaseous refrigerant delivered thereto by the compressor 15. This liquid refrigerant is then delivered to the cooling coil 14 through two different paths, both of which include pipes 20 and 21. One of these paths include a plain expansion valve 22 of any well known construction which operates to maintain a constant pressure on the coil 14. As is well-known in the art, such a plain expansion valve is in reality nothing more than a pressure reducing valve which is operated by the pressure on its eduction side. The liquid refrigerant may also pass from pipe 21 to the cooling coil 14 through two series connected valves 23 and 24. The valve 23 may be any suitable type of on or off valve and is herein shown as comprising a solenoid valve. The valve 24 is a thermostatic expansion valve which may be of any usual construction and includes a thermostatic bulb 25 which responds to the temperature of the refrigerant leaving the coil 14. The bulb 25 is herein shown as clamped to a pipe 26, by means of a clamp 27, the pipe 26 being connected to the end of the coil 14 and to pipe 17.

Whenever liquid refrigerant is available, if the solenoid valve 23 is closed, then refrigerant can pass through the coil 14 only by way of the plain expansion valve 22. This expansion valve is so set that the temperature of the coil 14 is maintained well below the dew-point temperature of the air passing thereover. If the solenoid valve 23 is open however, then liquid refrigerant can also pass through the coil 14 by way of the thermostatic expansion valve 24. Since the thermostatic bulb 25 thereof responds to the temperature of the refrigerant leaving the coil 14, this valve may be and is set so that the coil 14 is always flooded and is maintained at a relatively high temperature which may well be above the dew-point of the air passing over the same or slightly below the dew-point thereof.

The generation or supplying of liquid refrigerant may be controlled in any desirable manner and is herein shown as controlled by starting and stopping the compressor motor 16. This compressor motor 16 and the solenoid valve 23 are controlled by the cooperative action of a room or space responsive humidity controller, generally indicated at 30, and a room or space responsive temperature controller, or thermostat, generally indicated at 31.

The humidity responsive controller 30 comprises an actuator 32 that expands and contracts in response to changes in relative humidity and may well take the form of a plurality of strands of hair. One end of the actuator 32 is secured as indicated at 33 and its other end is connected to a suitable tension spring 34 by means of a cable 35. The other end of tension spring 34 is suitably fixed as indicated at 36 whereby the actuator 32 is maintained under tension at all times. A pair of switch carriers 37 and 38, which are respectively pivoted at 39 and 40, are secured to the cable 35 at points indicated at 41 and 42. The switch carrier 37 supports a mercury switch 43 which is arranged to be moved to circuit closed position when the relative humidity of the air to which the actuator 32 responds falls to some predetermined minimum. The switch carrier 38 supports a mercury switch 44 which is so arranged that it moves to circuit closed position when the relative humidity of the air to which the actuator 32 responds rises to some predetermined maximum. For the purposes of this explanation, it will be assumed that the mercury switch 43 is in closed circuit position for all relative humidity values below 50% and is in open circuit position for all relative humidity values thereabove. Likewise, it will be assumed that the mercury switch 44 is closed when the relative humidity rises to 60% and is opened for all relative humidity values therebelow.

The temperature responsive thermostat 31 includes an actuator 45 which is herein shown as comprising a bimetallic element having one of its ends fixed as indicated at 46. The other end of bimetallic element 45 controls three switch arms 47, 48 and 49 which respectively cooperate with three relatively fixed contacts 50, 51 and 52. The arrangement is such that switch arm 47 first engages contact 50, then switch arm 48 engages contact 51 and thereafter switch arm 49 engages contact 52 as the temperature to which actuator 45 responds increases. For the purposes of this explanation, it will be assumed that switch arm 47 engages contact 50 when the temperature rises to 72° F., the switch arm 48 engages contact 51 when the temperature rises to 75° F., and the switch arm 49 engages contact 52 when the temperature rises to 78° F. It will be understood that the temperature values set forth for the temperature responsive device 31 and the relative humidity values set forth for the relative humidity control 30 may be varied according to the conditions of any particular installation and that the examples given hereinabove are merely illustrative.

*Operation of the system of Fig. 1*

With the parts in the position shown, the relative humidity of the space to be controlled is below 50% so that the mercury switch 43 is closed and the mercury switch 44 is open. Also, the temperature of the space to be controlled is between 72° F. and 75° F. so that switch arm 47 is in engagement with contact 50 but the switch arms 48 and 49 are disengaged from their respective contacts 51 and 52. Under these conditions, the solenoid valve 23 is energized by a circuit as follows: line wire 55, wire 56, mercury switch 43, wire 57, wire 58, solenoid valve 23 and wire 59 to line wire 60. However, the compressor motor 16 is deenergized under these conditions so there is no available supply of liquid refrigerant. Under these conditions, no refrigerant is passing to the coil 14 so that the air passing thereover and being delivered to the room or space to be controlled is neither being cooled or dehumidified. These conditions of temperature and humidity are the desired normal conditions.

If the relative humidity of the room or space to be controlled should rise to 60%, then mercury switch 44 will be moved to closed circuit position, it being noted that mercury switch 43 will thereby be opened. Opening of mercury switch 43 deenergizes solenoid valve 23 by interrupting the circuit just described. Closure of mercury switch 44 energizes compressor motor 16 by the following circuit: line wire 55, wire 61, actuator 45, switch arm 47, contact 50, wire 62, mercury switch 44, wire 63, wire 64, compressor motor 16 and wire 65 to line wire 60. A supply of liquid refrigerant will thereupon be provided and this supply of liquid refrigerant can reach the cooling coil 14 only by passing through the plain expansion valve 22 since the solenoid valve 23 has been deenergized. The expansion valve 22 will thereupon maintain a pressure upon the coil 14 such that the temperature thereof will be well below the dew-point temperature of the air passing thereover. This air is therefore not only cooled but the moisture therein is condensed so as to lower its relative humidity. The relative humidity of the room or space to be controlled is thereby lowered. This cooling of the air below its dew-point will also result in cooling of the space or room to be controlled and, if the temperature thereof drops below 72° F., the switch arm 47 of the temperature controller 31 will disengage contact 50 whereupon the circuit for compressor motor 16 will be interrupted. In this manner, no more liquid refrigerant will be furnished to the cooling coil 14 so that no further cooling or dehumidification of the air passing thereover can be accomplished. Thus, the switch comprised by switch arm 47 and contact 50 operates as a minimum temperature control to prevent a lowering of the temperature of the room or space to be controlled below some desired minimum irrespective of the relative humidity.

Now if the relative humidity should return to 50% or therebelow so as to again open mercury switch 44 and reclose mercury switch 43, and if the temperature of the room or space rises to 75° F., so as to move switch arm 47 into engagement with contact 51, then solenoid valve 23 will again be energized by the circuit set forth above and, in addition, the compressor motor 16 will be energized by a circuit as follows: line wire 55, wire 61, bimetallic element 45, switch arm 48, contact 51, wire 66, wire 64, compressor motor 16, and wire 65 to line wire 60. The compressor 15 is thereupon again operated to furnish liquid refrigerant and this refrigerant now passes to the cooling coil 14 through the thermostatic expansion valve 24. The bulb 25 of the thermostatic expansion valve 24, in responding to the temperature of the refrigerant leaving the cooling coil 14, maintains the cooling coil temperature relatively high and perhaps above the dew-point of the air passing thereover whereby the refrigeration will be used substantially entirely for cooling purposes and no appreciable dehumidification will take place.

If this should result in a rise in relative humidity so that the relative humidity again rises above 50%, then the mercury switch 43 will be opened. This opening of mercury switch 43 will deenergize solenoid valve 23 whereupon the cooling coil 14 will be controlled by the plain expansion valve 22 so that the temperature of cooling coil 14 will be lowered below the dew-point temperature of the air passing thereover. Under these conditions, a dehumidifying action as well as some cooling will be obtained. The proportion of cooling and dehumidification that is obtained under these conditions will depend on how far below the dew-point temperature of the air passing over the coil 14 the temperature of such coil is maintained.

If the temperature of the room or space to be controlled should rise to 78° F. so that switch arm 49 is brought into engagement with contact 52, then the solenoid valve 23 will be energized and the compressor motor 16 will be operated irrespective of the relative humidity. This energizing circuit for the solenoid valve 23 is as follows: line wire 55, wire 61, bimetallic element 45, switch arm 49, contact 52, wire 67, wire 58, solenoid valve 23 and wire 59 to line wire 60. Therefore, under conditions of excessive temperature, the cooling coil 14 is maintained at a high temperature so that the whole effect of the refrigeration apparatus, or the greater part thereof, is utilized in cooling such air and substantially none of it is utilized in dehumidification. In this manner, the temperature of the room or space to be controlled can be maintained below an undesired maximum irrespective or the relative humidity conditions.

To recapitulate, the compressor motor 16 is operated whenever the room temperature rises to 75° F. and closes the switch defined by switch arm 48 and contact 51. Whether or not the liquid refrigerant thus supplied is utilized entirely for cooling or both for cooling and dehumidification depends upon the relative humidity. If the relative humidity is at 50% or therebelow, the mercury switch 43 is closed so that solenoid valve 23 is opened and under these conditions all cooling will be effected. On the other hand, if the relative humidity is above 50% so that mercury switch 43 is opened, then solenoid valve 23 will be deenergized and the coil 14 will be maintained below the dew-point of the air passing thereover so that dehumidification is effected, of course, being accompanied by a certain amount of cooling. If the relative humidity becomes excessive by rising to 60% or thereabove, the compressor motor 16 is operated even though the room temperature is below 75° F. but when switch arm 47 moves from engagement with contact 50 no further dehumidification can take place since the compressor motor 16 is thereby deenergized. Further, if the room temperature reaches some excessive value such as 78° F., the compressor motor 16 is operated and the solenoid valve 23 is opened irrespective of relative humidity conditions so that only cooling can be obtained to the exclusion of dehumidification.

Figure 2:
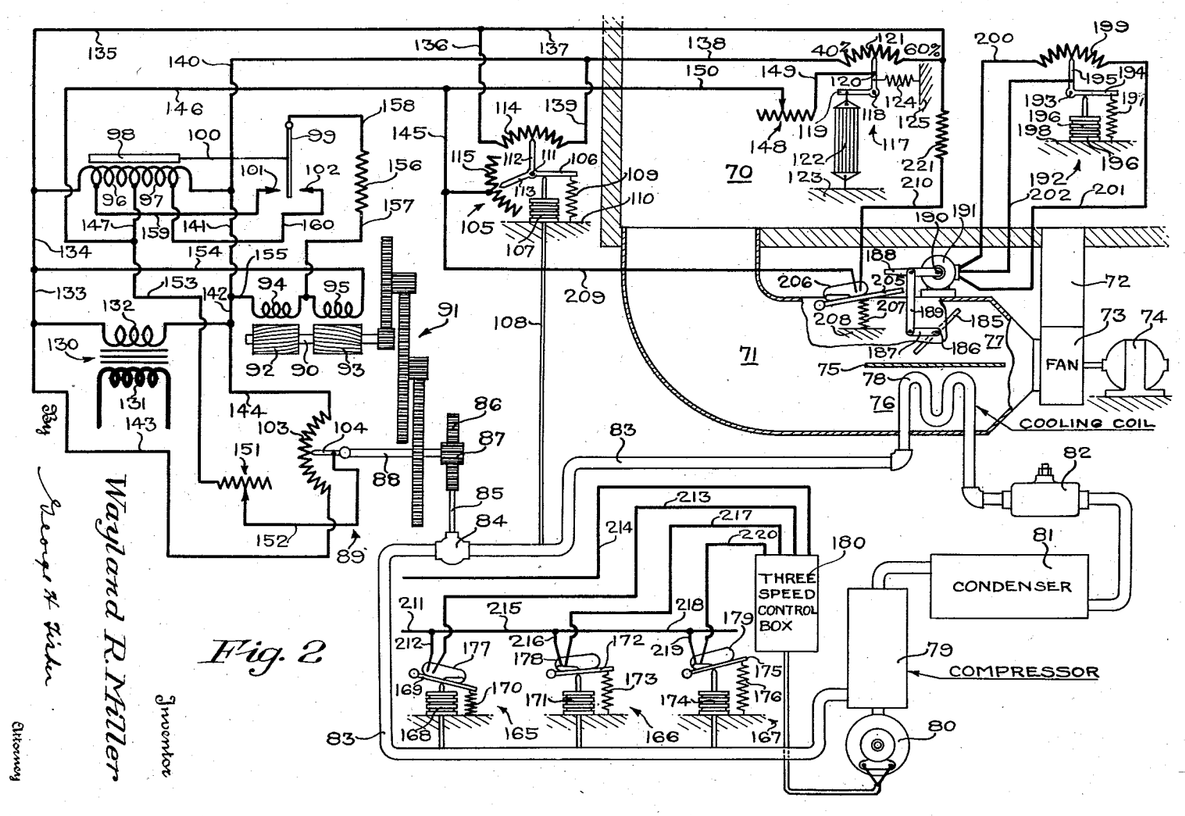
Fig. 2 is a showing of a modified system wherein variable back pressures are maintained on a cooling coil upon fluctuations in relative humidity in a space to be controlled and wherein temperature control is obtained by diverting or by-passing part of the air around such cooling coil.

Turning now to Fig. 2, a modified system is shown wherein a room or space to be conditioned is indicated at 70. Air is withdrawn from the room 70 and passed through an air conditioning chamber 71 after which it is delivered back to the room 70 by means of a delivery duct 72. This circulation of air may be obtained in any desired manner and is herein shown as being produced by means of a fan 73 which is driven by an electrical motor 74. The air conditioning chamber 71 is provided with a partition 75 which divides the chamber 71 into a cooling chamber 76, and a by-pass chamber 77.

Located in the cooling chamber 76 is a cooling coil 78. A compressor 79, which is operated by an electrical motor 80, serves to compress refrigerant which then passes to a condenser 81 after which it passes through a plain expansion valve 82 and to the cooling coil 78. A return line 83, by means of which the refrigerant is returned from the cooling coil 78 to the compressor 79, is provided with a throttling valve 84 which is controlled by the pressure in the return line between the throttling valve 84 and the cooling coil 78, the position of valve 84 also being modified in accordance with variations in the relative humidity of the space 70.

This valve 84 is provided with the usual valve stem 85 to which a rack 86 is secured. This rack 86 is driven by a pinion 87 which is secured to the final shaft 88 of a motor mechanism generally indicated at 89. This final shaft or main operating shaft 88 of the motor mechanism 89 is connected to a rotor shaft 90 through a speed reducing and torque amplifying gearing generally indicated at 91. Secured to the rotor shaft 90 is a pair of motor rotors 92 and 93 with which are associated field windings 94 and 95.

Operative energization of the field windings 94 and 95 is controlled by a relay mechanism that includes a pair of relay coils 96 and 97 which operate to position a single plunger 98. The coils 96 and 97 may take the form of a single long coil provided with a center-tap or may be in the form of separate coils which are connected together in series. The plunger 98 positions a switch arm 99 to which it is connected by a non-conducting and non-magnetic connection 100. The switch arm 99 in turn cooperates with a pair of spaced contacts 101 and 102, the arrangement being such that switch arm 99 engages contact 101 if relay coil 96 is energized sufficiently more highly than relay coil 97 and engages contact 102 if relay coil 97 is energized sufficiently more highly than relay coil 96.

The energizations of relay coils 96 and 97 are maintained substantially equal at all times, or are immediately substantially equalized in the event their energizations are unbalanced, by means of a balancing potentiometer which comprises a balancing resistance 103 and a cooperating balancing contact arm 104 which is driven by the main operating shaft 88 of the motor mechanism 89.

The energizations of relay coils 96 and 97 are primarily unbalanced by means of a pressure responsive controller generally indicated at 105. This pressure responsive controller includes a bell-crank having an actuating arm 106 which is positioned by a pressure responsive device such as a bellows 107. This bellows 107 is connected to the return line of the refrigeration system between the throttling valve 84 and the cooling coil 78 by means of a pipe 108. The pressure thus developed in the bellows 107 is opposed by a coiled spring 109 which has one of its ends secured to the actuating arm 106 and its other end secured to a suitable support 110 which also supports the bellows 107. This bell-crank is pivoted at 111 and further includes a control arm 112 and a corrector arm 113. The control arm 112 cooperates with a control resistance 114 and the corrector arm 113 cooperates with a corrector resistance 115.

The action of the pressure responsive controller 105 upon the relay coils 96 and 97 is arranged to be modified by a compensating control responsive to the relative humidity of the space 70. This relative humidity responsive compensating control is indicated generally at 117 and includes a bell-crank pivoted at 118. This bell-crank includes an actuating arm 119 and a compensating arm 120 which cooperates with a compensating resistance 121. Connected to the actuating arm 119 is a relative humidity responsive element 122, which has one of its ends secured to the actuating arm 119 and its other end secured to a suitable support 123. In order to maintain the relative humidity responsive element 122 under proper tension, a coiled spring 124 has one of its ends attached to the compensating arm 120 and its other end attached to a suitable support 125.

Electrical power is supplied to the motor mechanism 89 and the associated controller and compensator as well as to the relay mechanism by means of a step-down transformer 130 having a high voltage primary 131 and a low voltage secondary 132. The relay coils 96 and 97, in series, the control resistance 114 and the compensating resistances 121 are all connected in parallel across the secondary 132 by means of wires 133 to 142 inclusive. Similarly, the balancing resistance 103 is connected across the secondary 132 by means of wires 143 and 144. The center of corrector resistance 115 is connected to the junction of relay coils 96 and 97 by wires 145, 146 and 147. The compensating arm 120 of the compensating control 117 is also connected to the junction of relay coils 96 and 97, through an adjustable rheostat 148, by wires 149, 150, 146 and 147. Similarly, the balancing contact arm 104 is connected to the junction of relay coils 96 and 97 through a manually adjustable rheostat 151, by means of wires 152, 153 and 147. The field windings 94 and 95, in series, are connected across the secondary 132 by wires 133, 154, 155 and 142. The junction of the field windings 94 and 95 is connected to the switch arm 99, through a resistance 156, by wires 157 and 158. The contact 101 is connected to a small number of turns of the relay coil 96 by a wire 159 and the contact 102 is similarly connected to a small number of turns of the relay coil 97 by a wire 160.

As will be explained more in detail hereinafter, the pressure responsive controller 105 operates to maintain a constant pressure in the return line between the throttling valve 84 and the cooling coil 78. The valve of this constant pressure thus maintained is lowered and raised by the relative humidity responsive compensating control 117 as the relative humidity of the space 70 increases and decreases. The compressor motor 80 in this particular embodiment of the invention is then controlled by the pressure in the return line between the throttling valve 84 and the compressor 79. In this particular instance, this control is obtained by a plurality of pressure responsive controllers generally indicated at 165, 166 and 167. The pressure controller 165 includes a pressure responsive device or bellows 168 that positions a switch carrier 169 against the action of a biasing spring 170. Similarly, the pressure controller 166 includes a bellows 171 that positions a switch carrier 172 against the biasing action of a spring 173. In exactly the same manner, the pressure controller 167 includes a bellows 174 that positions a switch carrier 175 against the biasing action of a spring 176. The switch carriers 169, 172 and 175 respectively, support mercury switches 177, 178 and 179, the arrangement being such that these mercury switches sequentially move to open circuit position in the order named as the pressure in the return line between the throttling valve 84 and the compressor 79 lowers. These mercury switches control the speed of compressor motor 80 through the medium of a three-speed starting or control box 180.

In order to control the temperature of the room or space 70, more or less air is by-passed or diverted around the cooling coil 78 by means of a by-pass damper 185. This by-pass damper 185 is located in the by-pass chamber 77 and is secured to a pivoted shaft 186 to which a crank 187 is also secured. This crank 187 is connected to a similar crank or lever 188 by means of a connecting link 189. The crank or lever 188 is secured to the final driving shaft 190 of a motor mechanism 191 which may take the general form of the motor mechanism 89. The motor mechanism 191 is controlled by a single potentiometer controller responsive to the dry bulb temperature of the space 70 which is indicated at 192. This temperature responsive controller 192 includes a bell-crank pivoted at 193 which is provided with an actuating arm 194 and a control arm 195. The actuating arm 194 is positioned by a bellows 196 that is charged with a suitable volatile fluid so as to be responsive to temperature. The variable pressures created in the bellows 196 are opposed by a coiled spring 197 which has one of its ends connected to the actuating arm 194 and its other end connected to a suitable support 198. The support 198 also serves to mount the bellows 196. The control arm 195 cooperates with a control resistance 199. The ends of control resistance 199 are connected to the motor means 191 by wires 200 and 201 and the control arm 195 is connected thereto by a wire 202.

Under conditions of excessive dry bulb temperature in the space 70 it may be desirable to operate the cooling coil 78 at its lowest temperature in order to greatly reduce the dry bulb temperature even though the relative humidity is not unduly high. For this purpose, a switch carrier 205 is provided that lies in the path of movement of the crank or lever 188 which is operated by the motor means 191. This switch carrier 205 supports a mercury switch 206 that is normally biased to an open position by means of a compression spring 207 which has one of its ends abutting the underside of the switch carrier 205 and its other end abutting a suitable support 208. One terminal of this mercury switch 206 is connected to the junction of relay coils 96 and 97 by being connected to the wire 145 by means of a wire 209. The other terminal of this mercury switch 206 is connected to the left-hand end of relay coil 96 by being connected to the wires 137 by means of a wire 210.

*Operation of the system of Fig. 2*

In the system of Fig. 2, the fan motor 74 continuously drives fan 73 to cause a continuous circulation of air from the space 70 through the air conditioner and back to the space. With the parts in the position shown, the relative humidity of the space is at an intermediate value so the pressure controller 105 operates to maintain an intermediate pressure in the return line 83 between the throttling valve 84 and the cooling coil 78. As shown, the control arm 112 of the pressure responsive controller is engaging the center of control resistance 114 and under the conditions assumed, the compensating arm 120 of the compensating control 117 is engaging the center of compensating resistance 121. Under these conditions, the main operating shaft 88 is in intermediate position in which the throttling valve 84 is half open and the balancing contact arm 104 is engaging the center of balancing resistance 103. As a result, the relay coils 96 and 97 are substantially equally energized and the switch arm 99 is intermediate contacts 101 and 102. The field windings 94 and 95 are therefore connected in series across the secondary 132 and are equally energized. The two rotors 92 and 93 oppose each other and by reason of the fact that their respective field windings are equally energized, the rotor shaft 90 remains stationary.

If the pressure in return line 83 between the throttling valve 84 and cooling coil 78 should now decrease to a slight extent, the control arm 112 of the pressure controller 105 will move along control resistance 114 towards the right-hand end thereof. This movement of the control arm 112 changes the voltage drops across relay coils 96 and 97 so that the relay coil 96 becomes more highly energized than the relay coil 97. When this difference in energization is sufficient due to a sufficiently large drop in pressure, plunger 98 will move to the left far enough to bring switch arm 99 into engagement with contact 101. This establishes a circuit through resistance 156 and the small number of turns of relay coil 96, placing them in parallel with the field winding 95. The circuit for field windings 94 and 95 is then as follows: from the right-hand side of secondary 132, wire 142, wire 155, through field winding 94, whereupon the circuit branches, one portion going by way of field winding 95, wire 154, and wire 133 to the left-hand side of secondary 132 whereas the other portion goes by way of wire 157, resistance 156, wire 158, switch arm 99, contact 101, wire 159, the small number of turns of relay coil 96, wire 134, and wire 133 to the left-hand side of secondary 132. The field winding 94 is now energized more highly than the field winding 95 whereupon the rotor 92 overpowers the rotor 93 and moves the main operating shaft 88 in counter-clockwise direction as viewed from the left. Such movement of the main operating shaft 88 causes a downward movement of rack 86 and a consequent closing movement of the throttling valve 84. This movement of the main operating shaft 88 also causes balancing contact 104 to move downwardly along balancing resistance 103 towards its lower end. The energization of the small number of turns of relay coil 96 creates an additional pull on plunger 98 which causes switch arm 99 to engage contact 101 more firmly. When this counter-clockwise rotation of main operating shaft 88 has been sufficient, the movement of balancing contact arm 104 downwardly along balancing resistance 103 again substantially equalizes the voltage drops across the relay windings 96 and 97 so as to substantially equalize the current flows therethrough. Plunger 98 therefore moves to the right and slightly separates switch arm 99 from contact 101. This interrupts the circuit through the resistance 156 and the small number of turns of relay winding 96 so as to remove the additional attractive force on plunger 98 and cause a relatively wide separation of switch arm 99 and contact 101 and again places the field windings 94 and 95 in series across the secondary 132. Further rotation of the main operating shaft 88 will therefore cease.

In this manner, a reduction in the pressure between the throttling valve 84 and cooling coil 78 causes a partial closure of this throttling valve 84 so that the suction action of the compressor upon the cooling coil is reduced. This pressure will therefore tend to rise. If the pressure falls sufficiently, the throttling valve 84 will be completely closed.

On the other hand, a rise in this pressure causes movement of control arm 112 along control resistance 114 towards its left-hand end. This causes an increase in the voltage drop across the relay coil 97 over that across the relay coil 96 wherefore the plunger 98 tends to move to the right. When the pressure has arisen sufficiently, switch arm 99 engages contact 102. The resistance 156 and the small number of turns of relay coil 97 are then placed in parallel with the field winding 94, the circuit for field windings 94 and 95 and these other parts being as follows: from the left-hand end of secondary 132, wire 133, wire 154, and through field winding 95, whereupon the circuit branches, one part going by way of field winding 94, wire 155 and wire 142 to the right-hand end of secondary 132, whereas the other portion goes by way of wire 157, resistance 156, wire 158, switch arm 99, contact 102, wire 160, the small number of turns of relay coil 97, wire 141, and wire 142 to the right-hand end of secondary 132. The rotor 93 now overpowers the rotor 92 and drives the main operating shaft 88 in the reverse direction to move the throttling valve 84 towards open position and to move balancing contact arm 104 upwardly along balancing resistance 103. The energization of the small number of turns of relay coil 97 increases the pull on armature 98 in a right-hand direction so as to hold switch arm 99 in firm engagement with contact 102. When the main operating shaft 88 has thus moved sufficiently far, the voltage drops across relay coils 96 and 97 will again be substantially equalized so that plunger 98 returns to the left just far enough to separate switch arm 99 from contact 102. The field windings 94 and 95 are thus again placed in series across the secondary 132 and further movement of main operating shaft 88 ceases. The deenergization of the small number of turns of the relay coil 97 removes the additional attractive force on plunger 98 wherefore switch arm 99 separates appreciably from contact 102.

The function of resistance 156 is in the nature of a protective resistance to limit the amount of current flowing through the field windings 94 and 95 when the series parallel circuits described above are set up due to engagement of switch arm 99 with its cooperating contacts 101 and 102. The function of the rheostat 151 is to interpose sufficient resistance in the balancing circuit to necessitate a relatively large movement of main operating shaft 88 in response to a relatively small movement of the control arm 112 of the pressure responsive controller 105. In this manner, a complete movement of main operating shaft 88 from valve open position to valve closed position and vice versa is obtained upon movement of control arm 112 over only a portion of the control resistance 114. In other words, the operating differential of the controller 105 is less than the complete operating range thereof.

The compensating controller 117 serves to shift the operating range of the controller 105 within its total range of movement. With the relative humidity at an intermediate point, as shown in the drawings, so that the compensating arm 120 is engaging the center of compensating resistance 121, the operating range of the controller 105 is in the middle of its total range. However, if the relative humidity should rise somewhat so that compensating arm 120 moves along compensating resistance 121 towards its right-hand end, the voltage drop across relay coil 96 is decreased in respect to the voltage drop across relay coil 97. As a result, the pressure in the line between throttling valve 84 and cooling coil 78 must be reduced and cause movement of control arm 112 towards the right along control resistance 114 in order for the energizations of relay coils 96 and 97 to be substantially equal when the throttling valve 84 is half open. In this manner, a rise in the relative humidity in the space causes a shifting in the control point of the controller 105 so that a lower pressure is maintained between the throttling valve 84 and cooling coil 78 wherefore the temperature of the cooling coil is reduced. Similarly, a decrease in the relative humidity of the space 70, accompanied by movement of compensating arm 120 along compensating resistance 121, causes a decrease in the energization of relay coil 97 so that a higher pressure must be maintained on the suction side of the cooling coil 74 in order for the valve 84 to be half open. In this manner, the suction pressure on the cooling coil is reduced and increased as the relative humidity of the space rises above and falls below an intermediate desired value. In other words, the temperature of the cooling coil 78 is reduced and increased upon rise and fall in relative humidity.

The function of the rheostat 148 is to enable the controller 105 to have dominating control of the motor means 89 even though the compensating arm 120 of the compensating control 117 moves to one of its extreme positions so that it directly engages either the wire 137 or the wire 138. If it were not for this rheostat, such engagement of the compensating arm 120 would cause a complete short-circuiting of one or the other of the relay coils 96 or 97 and the controller 105 would be unable to take dominating command. The function of the corrector resistance 115, a part of which is included in the control circuit upon movement of the control arm 112 in either direction from the center of control resistance 114, is not only to prevent complete short-circuiting of either relay coil 96 or 97 upon extreme movements of the controller 105 but also operates to maintain the operating differential of the controller 105 substantially constant irrespective of whether this operating range be in the middle or be shifted toward one or the other end of its total range of operation by reason of fluctuations in the relative humidity of the space.

Whenever the valve 84 is relatively widely opened, the pressure in the return line between the valve 84 and the compressor 79 will tend to become quite high. Under these conditions, mercury switch 177 moves to closed position and completes a circuit to the three-speed control box 180 which results in operation of compressor 80 at high speed. This circuit is as follows: line wire 211, wire 212, mercury switch 177, wire 213, three-speed control box 180, and line wire 214. When the valve 84 is partially closed, the action of compressor 79 will tend to reduce the pressure in the line 83 between the throttling valve 84 and the compressor 79 so that mercury switch 177 opens. However, under these conditions, mercury switch 178 is still closed so that there is a circuit through the three-speed control box 180 that operates the compressor 80 at an intermediate speed. This circuit is as follows: line wire 211, wire 215, wire 216, mercury switch 178, wire 217, three-speed control box 180, and line wire 214. Similarly, a further closing movement of the throttling valve 84 tends to further decrease the pressure in this line so that mercury switch 178 opens but mercury switch 179 is still closed. Mercury switch 179 controls a circuit through the three-speed control box that results in operation of compressor 80 at a relatively low speed. This circuit is as follows: line wire 211, wire 215, wire 218, wire 219, mercury switch 179, wire 220, three-speed control box 180, and line wire 214. If the pressure in this line should be further reduced, mercury switch 179 will also open whereupon the compressor 80 ceases to operate.

In this manner, the pressure and therefore the temperature of the cooling coil 78 is varied in conformity to variations in the relative humidity of the space and the compressor motor 80 is operated at varying speeds in accordance with the load thereon.

In order to control the dry bulb temperature of the space 70, the dry bulb controller 192 variably positions the by-pass damper 185 to cause more or less air to flow around the cooling coil 78 and through the by-pass chamber 77. As the dry bulb temperature decreases, the main operating shaft 190 of the motor means 191 rotates in a clockwise direction to lift link 189 and rotate by-pass damper 185 towards its horizontal position to allow more and more of the air being delivered to the space 70 to pass through the by-pass chamber 77 and mix with the cooled air so that the temperature of the space 70 is reduced to a less extent. On the other hand, as the temperature of the space rises, main operating shaft 190 of the motor mechanism 191 rotates in a counter-clockwise direction to move by-pass damper 185 towards its vertical position in which more and more of the air delivered to the space is caused to pass over the cooling coil 78. This causes a decrease in the temperature of the space 70.

It is conceivable that under certain conditions, the relative humidity of the space may be fairly low so that the temperature of the cooling coil is maintained at a relatively high point. Under these conditions, if the space temperature should become excessive, the passing of all of the air delivered to the space over this cooling coil 78 might not cause the desired reduction in the space temperature. Means are therefore provided to cause a decrease in the temperature of the cooling coil 78 whenever the by-pass damper 185 moves to its vertical position. When the main operating shaft 190 of the motor means 191 is rotated counter-clockwise sufficiently far to move this by-pass damper to its full vertical position, then the lever or crank 188 engages the switch carrier 205 and depresses the same against the action of the spring 207 so as to close the mercury switch 206. Such closure of mercury switch 206 short-circuits the relay coil 96 and switch arm 99 engages contact 102 to open throttling valve 84 to its full open position. This causes the pressure in the line between throttling valve 84 and the compressor 79 to increase to a maximum and the compressor is therefore operated at full speed. As the result, maximum refrigerating action is obtained under these conditions to reduce the temperature of the space. A resistance 221 is preferably placed in the wire 210 to prevent complete short-circuiting of the relay coil 96.

In actual practice, the usual limit switches would be associated with the motor means 89 to determine the limits of movement of the main operating shaft 88 rather than depending upon a balancing out process by the balancing potentiometer comprised by the balancing resistance 103 and balancing contact arm 104. For a more complete understanding of the manner in which the motor mechanism 89 is controlled by a controller and a compensator, reference may be had to the copending application of John E. Haines, Ser. No. 38,946, filed September 3, 1935. It is thought from the above description that the manner in which the motor means 191 is controlled by a single potentiometer controller 192 should be evident. However, instead of providing a motor means 191 of the electrically balanced type, this control system may well take the form shown in Cunningham Patent No. 1,989,972 which issued February 5, 1935.

Figure 3:
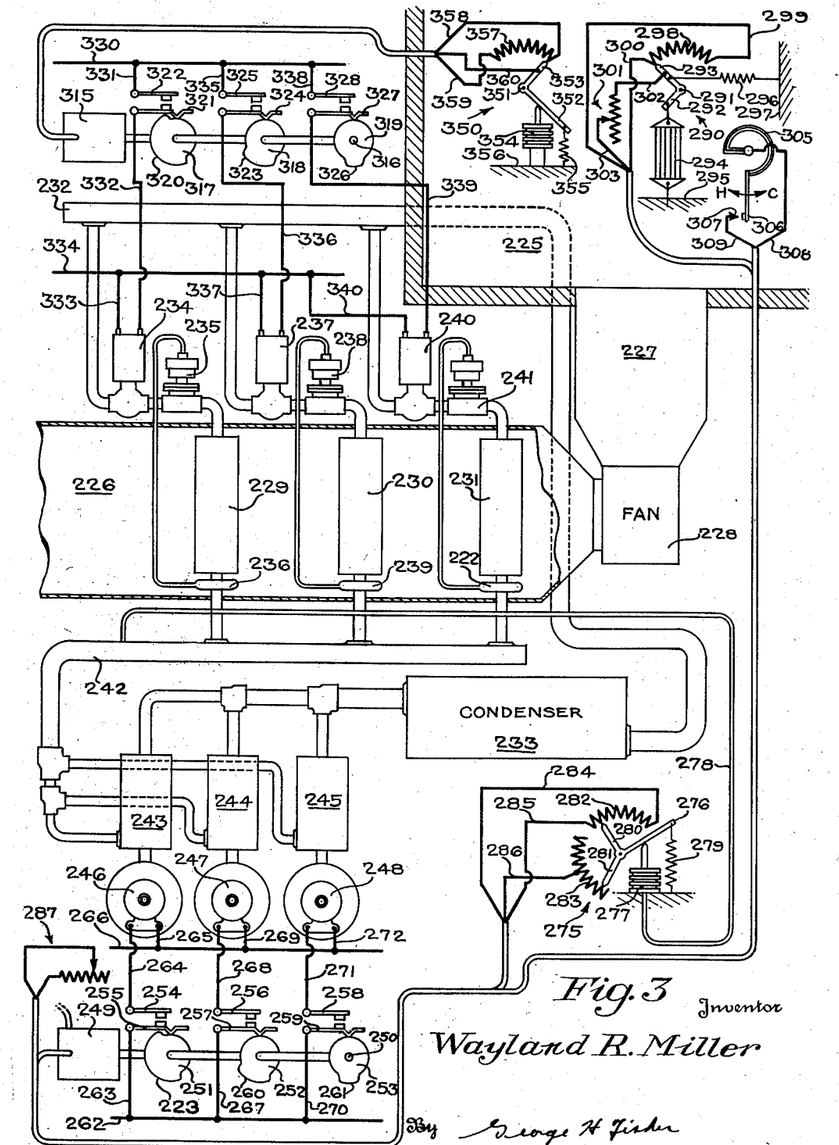
Fig. 3 is a showing of a further modification wherein the temperature of a space is controlled by placing variable numbers of cooling coils in operation and in which the relative humidity of such space is controlled by the varying the temperature of such coils.

Turning now to Fig. 3 of the drawings, a further modification is shown wherein a space to be conditioned is indicated at 225. An air conditioning chamber indicated at 226 is connected to the space 225 by a delivery duct 227. Any suitable means, such as the fan indicated at 228, may be utilized to produce a flow of air through the air conditioning chamber 226 and into the space 225. As is usual in the art, the air supplied to the air conditioning chamber 226 may be taken from the outdoors or the space 225 or in predetermined mixtures of these two types of air under manual or any of the usual automatic controls. In this embodiment of the invention, instead of cooling the air varying degrees by maintaining the cooling coil at varying temperatures to obtain varying space temperatures, this is accomplished by rendering a varying number of cooling coils, over which the air must pass in series, operative. Specifically, the air conditioning chamber 226 is provided with three cooling coils indicated at 229, 230 and 231. These cooling coils 229, 230 and 231 are all supplied with liquid refrigerant from a supply header 232 which is connected to a suitable condenser 233. Between the supply header 232 and the cooling coil 229, there is interposed an electrically operable shut-off valve 234 and a thermostatic expansion valve 235 having the usual controlling bulb 236 which responds to the temperature at the outlet of the cooling coil 229. Similarly, the cooling coil 230 is connected to the supply header 232 through an electrically operable shut-off valve 237 and a thermostatic expansion valve 238 which includes the usual controlling bulb 239 which responds to the temperature of the outlet side of the cooling coil 230. In exactly the same manner, the cooling coil 231 is connected to the supply header 232 through an electrically operable shut-off valve 240 and a thermostatic expansion valve 241 that is provided with a control bulb 222 which responds to the temperature of the cooling coil 231 at its outlet side.

The cooling coils 229, 230 and 231 all discharge into a common return header 242. In this embodiment of the invention, instead of having a single compressor that operates at varying speeds, a multiplicity of compressors are utilized which are brought into operation in sequence as the load increases. These compressors are indicated at 243, 244, and 245 and are all connected to the return header 242 and to the condenser 233. These compressors are respectively provided with compressor motors 246, 247 and 248.

In this instance, the compressor motors 246, 247 and 248 are energized in direct response to changes in the pressure in the return header 242. For this purpose, a motorized mechanism 249 is provided with an extended main operating shaft 250 which has mounted thereon three cams 251, 252 and 253. Cam 251 controls a switch that includes a stationary switch arm 254 and a movable switch arm 255. Cam 252 controls a similar switch that includes a stationary switch arm 256 and a movable switch arm 257. Similarly, cam 253 controls a switch that includes a stationary switch arm 258 and a movable switch arm 259. With the parts in the position shown, the main operating shaft 250 is in one of its extreme positions and, under these conditions, the movable switch arms 255, 257 and 259 are all disengaged from their respective cooperating stationary switch arms 254, 256 and 258. The cam 251 is provided with an operating portion 223 which has a length corresponding substantially to the total range of movement of the main operating shaft 250. The cam 252 has an operating portion 260 of considerably shorter length and the cam 253 has an operating portion 261 of even shorter length. The arrangement is such that upon movement of main operating shaft 250 from the extreme position in which it is shown towards its other extreme position, a relatively small amount of initial movement causes operating portion 223 of cam 251 to engage the movable switch arm 255 and move the same into engagement with switch arm 254. When the main operating shaft 250 has traveled about half of its movement, then the cam 252 brings its operating portion 260 into engagement with movable switch arm 257 to move the same into engagement with switch arm 256, and when the main operating shaft 250 has substantially completed its movement so that it approaches its opposite extreme position, then the operating portion 261 of cam 253 engages switch arm 259 and moves the same into engagement with switch arm 258. In this manner, as the main operating shaft 250 travels from the one extreme position in which it is shown to its other extreme position, these three switches are sequentially closed. The first of these switches controls a circuit to compressor motor 246 which is as follows: line wire 262, wire 263, switch arm 255, switch arm 254, wire 264, compressor motor 246, wire 265, and line wire 266. Similarly, the second of these switches controls a circuit to compressor motor 247 which is as follows: line wire 262, wire 267, switch arm 257, switch arm 256, wire 268, compressor motor 247, wire 269, and line wire 266. Likewise, the last of these switches controls a circuit to compressor motor 248 which is as follows: line wire 262, wire 270, switch arm 259, switch arm 258, wire 271, compressor motor 248, wire 272, and line wire 266. As the result, travel of main operating shaft 250 from the extreme position in which it is shown to its opposite extreme position sequentially energizes compressor motors 246, 247 and 248.

The positioning of the main operating shaft 250 by the motor mechanism 249 is controlled primarily by a controller generally indicated at 275 which responds to the pressure in the return header 242. This controller 275 includes a bell-crank having an operating arm 276 which is positioned by a bellows 277 that is connected to the return header 242 by means of a pipe 278. The pressures thus created in the bellows 277 are opposed by a coil spring 279. This bell-crank further includes a control arm 280 and a corrector arm 281, the control arm 280 cooperating with a control resistance 282 and the corrector arm 281 cooperating with a corrector resistance 283. The opposite ends of the control resistance 282 and the mid-portion of the corrector resistance 283 are connected to the motor means 249 by wires 284, 285 and 286. Associated with the motor means 249 and its controller 275 is a manually operable rheostat 287 by which the amount of movement of control arm 280 in respect to its control resistance 282 required to cause a complete movement of main operating shaft 250 from one of its extreme positions to its other extreme position may be determined. The setting of this rheostat 287 is such that only a small part of the total range of movement of the controller 275 is required to cause a complete movement of main operating shaft 250.

The particular portion of the total range of movement of controller 275 which will be effective to cause complete movement of main operating shaft 250 is determined by a compensating control, generally indicated at 290 which responds to the relative humidity of the space 225. This compensating control includes a bell-crank which is pivoted at 291 and is provided with an operating arm 292 and a control arm 293. One end of a humidity responsive element 294 is secured to the operating arm 292 and its other end is secured to a suitable support 295. A coiled spring 296 has one of its ends secured to the compensating arm 293 and its other end secured to a suitable support 297 and serves to maintain the humidity responsive element 294 under proper tension. The compensating arm 293 cooperates with a compensating resistance 298. This compensating resistance 298 is connected to the motor means 249 by means of wires 299 and 300. The compensating arm 293 is connected to the motor means 249 through a manually adjustable rheostat 301 and by means of wires 302 and 303. The manually operable rheostat 301 operates to maintain the controller 275 in dominating control of the motor mechanism 249 even though the compensating control 290 moves to one of its extreme positions.

The motor mechanism 249 is additionally controlled by a space temperature responsive thermostat that includes a bimetallic actuating element 305 which positions a contact blade 306 that is adapted to cooperate with a stationary contact 307. This thermostat is connected to the motor mechanism 249 by wires 308 and 309.

The electrically operable shut-off valves 234, 237 and 240 are controlled by the temperature of the space 225 through a motor mechanism 315. This motor mechanism drives a main operating shaft 316 to which is secured three cams 317, 318 and 319. The cam 317 is provided with an operating portion 320 of relatively long length which is arranged to move a movable switch arm 321 into engagement with a stationary switch arm 322. Similarly, the cam 318 is provided with an operating portion 323 of shorter length which is adapted to move a movable switch arm 324 into engagement with a stationary switch arm 325. Likewise, the cam 319 is provided with an operating portion 326 which is arranged to move a movable switch arm 327 into engagement with a switch arm 328.

The switch arms 321 and 322 control a circuit to shut-off valve 224 as follows: line wire 330, wire 331, switch arm 322, switch arm 321, wire 332, shut-off valve 234 and wire 333 to line wire 334. The switch arms 324 and 325 control a circuit to shut-off valve 237 as follows: line wire 330, wire 335, switch arm 325, switch arm 324, wire 336, shut-off valve 237 and wire 337 to line wire 334. Likewise, the switch arms 328 and 327 control a circuit to shut-off valve 240 which is as follows: line wire 330, wire 338, switch arm 328, switch arm 327, wire 339, shut-off valve 240 and wire 340 to line wire 334. With the parts in the position shown, the main operating shaft 316 is in one of its extreme positions. Upon a relatively small initial movement of this operating shaft 316 towards its other extreme position, the operating portion 320 of cam 317 moves switch arm 321 into engagement with switch arm 322 whereby to energize shut-off valve 234 and move the same to open position. When the main operating shaft 316 has moved through about half of its range of movement, the operating portion 323 of cam 318 moves switch arm 324 into engagement with switch arm 325 whereupon shut-off valve 237 is energized to open the same. Then, when the main operating shaft 316 has nearly reached its other limit of movement, the operating portion 326 of cam 319 engages switch arm 327 to move the same into engagement with switch arm 328 whereupon the shut-off valve 240 is energized and moves towards open position. In this manner, progressive movement of the main operating shaft from the extreme position in which it is shown towards its other extreme position causes sequential energization and opening of the shut-off valves 234, 237 and 240.

The motor mechanism 315, and therefore the position of the main operating shaft 316, is controlled by a controller 350 which responds to the dry bulb temperature of the space 225. This controller includes a bell-crank pivoted at 351 which is provided with an operating arm 352 and a control arm 353. The operating arm 352 is positioned by a thermostatic member herein shown in the form of a bellows 354 which is charged with a suitable volatile fluid so that varying pressures are generated therein upon temperature changes. A coiled spring 355 is arranged to oppose the variable pressures thus created in the bellows 354 and has one of its ends secured to the operating arm 352 and its other end secured to a suitable support 356 to which one end of bellows 354 is also secured. The control arm 353 cooperates with a control resistance 357 which has its opposite ends connected to the motor mechanism 315 by wires 358 and 359. In addition, the operating arm 353 is also connected to the motor mechanism 315 by a wire 360.

*Operation of the system of Fig. 3*

The parts have been shown in an extreme position in Fig. 3 which ordinarily probably would not occur during normal operation. As shown, the temperature of the space is low so that the control arm 353 of the controller 350 is engaging the extreme right-hand end of control resistance 357. Under these conditions, the motor mechanism 315 is in an extreme position as is the main operating shaft 316 as explained above. Therefore, none of the switches controlled by the cams 317, 318 and 319 are closed so that all of the electrically operable shut-off valves 234, 237 and 240 are closed and no refrigerant can flow from the supply header 232 to any of the cooling coils 229, 230 or 231. In this manner, under extreme conditions wherein the dry bulb temperature reaches its low permissible limit, no cooling or dehumidifying action can take place. Also, an extreme relative humidity condition has been shown wherein the relative humidity of the space is at the lower limit of its desired range so that the compensating arm 293 of the compensating control 290 is engaging the extreme left-hand of compensating resistance 298. Under these conditions, the control point of the pressure responsive controller 275 has been shifted so that a high pressure will be maintained in the return header 242. If this pressure should increase too much, the bellows 277 will expand and control arm 280 will move a little further along control resistance 282 towards its left-hand end so as to move main operating shaft 250 of the motor mechanism 249 towards its other extreme position and cause energization of the compressor motor 246. Inasmuch as all of the shut-off valves 243, 237 and 240 are closed, operation of this one compressor motor 246 would quickly reduce the pressure in the return header 242 and cause return movement of control arm 280 to the position shown wherein main operating shaft 250 returns to its extreme position and deenergizes compressor motor 246.

Assuming now that the temperature of the space 225 should rise somewhat, control arm 353 of the temperature responsive controller 350 will move along control resistance 357 towards its left-hand end and cause corresponding movement of main operating shaft 316 of the motor mechanism 315. A slight initial movement of this main operating shaft 316 moves switch arm 321 into engagement with switch arm 322 to energize the shut-off valve 234 which thereupon opens. Refrigerant therefore flows to the cooling coil 229 and this coil is filled with refrigerant under the well-known action of the thermostatic expansion valve 235. The air passing through the air conditioning chamber 226 is therefore cooled in an effort to reduce the temperature of the space 225. But with the relative humidity remaining at its original value, the back-pressure in the return header 242 and therefore on the cooling coil 229 is relatively high so that the temperature of the coil 229 is also relatively high. Under these conditions, the air being delivered to the space 225 may not be cooled sufficiently by this single coil so that the temperature of the space continues to rise. If this happens, the control arm 353 of the temperature responsive controller 350 will continue to move along control resistance 357 towards its left-hand end so as to cause further rotation of main operating shaft 316 and finally move switch arm 324 into engagement with switch arm 325. Shut-off valve 237 is therefore energized and moves to open position whereupon refrigerant flows to the cooling coil 213. This cooling coil is filled with refrigerant under the control of the thermostatic valve 238. A further increase in the space temperature will result in further movement of main operating shaft 316 to its other extreme position to open shut-off valve 240 and cause the cooling coil 231 to be filled with refrigerant. In this manner, the temperature controller 350 sequentially brings the cooling coils 229 and 230 and 231 into operation as the temperature rises, the number of cooling coils brought into operation depending upon the load on the space 225 and the operating temperature of the cooling coil depending upon the value of the relative humidity as will now be explained.

As pointed out above, a high back-pressure is being maintained in the return header 242 with the relative humidity at the low value shown by the position of the compensating control 290. If the relative humidity should increase, compensating arm 293 will move along compensating resistance 298 towards its right-hand end and thereby shift the control point of the pressure-responsive controller 275 towards its right-hand end. The controller 275 will therefore operate the motor mechanism 249 to energize and deenergize compressor motors 246 and 247 and 248 in a manner to maintain a lower back-pressure in the return header 242 wherefore the cooling coils which are in operation will be maintained at lower temperatures. This lower temperature will cause the removal of more moisture from the air than the higher temperature therefore maintained so that more dehumidifying action will take place. With this lower coil temperature, the temperature of the space 225 may again fall to such an extent that only two or none, or perhaps an extreme condition will be reached, wherein none of the cooling coils are in operation.

On the other hand, if the relative humidity remains at the low value shown, and the temperature of the space becomes excessive even though all three cooling coils are in operation, then the contact blade 306 will be moved into engagement with contact 307 by the thermostatic element 305 and operate motor mechanism 249 to its other extreme position in which all of the compressor motors 246, 247 and 248 are in operation. The pressure in return header 242 is therefore greatly reduced and the temperature of the cooling coils is reduced to provide the necessary amount of cooling action to return the temperature of the space 225 to within reasonable limits. Of course, this lower temperature of these cooling coils will result in greater dehumidification even though such dehumidification is not necessary.

From the foregoing, it will be seen that the system of Fig. 3 varies the temperature of the cooling coils according to the relative humidity in the space so that more or less dehumidification takes place, depending upon whether the humidity be high or low. In addition, the number of cooling coils in operation is controlled by space temperature so that if the space temperature is lower than desired, none of the coils can be placed in operation even though the relative humidity is higher than desired. On the other hand, all of the coils are placed in operation and the temperature thereof is reduced to the lowest possible point even though dehumidification is not required in the event the temperature of the space becomes excessive. When the space temperature is between these extreme low and high values however, the temperature of the cooling coils depends at all times upon the relative humidity conditions in the space and the proper temperature is maintained by bringing into operation the amount of coils necessary under the prevailing coil temperatures. The function of the thermostatic expansion valves 235, 238 and 241 is to maintain their respective coils full of refrigerant, rather than to vary the coil temperature.

From the foregoing, it will be seen that in this application, I have disclosed three different systems wherein refrigerating apparatus is operated in the most economical manner so as to provide the desired cooling and dehumidifying effects while maintaining the temperature to be controlled in dominating control in that maximum cooling can be obtained irrespective of the relative humidity if the temperature of the space being controlled becomes too high. Further, in some instances, no cooling at all can be obtained if the space temperature becomes too low. It will be readily seen that many changes could be made in the systems disclosed herein and it is to be understood that these systems are merely exemplary of some of the forms which my invention may take. I intend therefore only to be limited by the scope of the appended claims.

I claim:

1. In an air conditioning system for a space, in combination, means to cool the air in the space comprising a direct expansion refrigeration system, space moisture responsive means in control of said cooling means to gradually increase the effect thereof as the moisture content increases, and means responsive to the temperature of the space to increase the cooling effect of the cooling means to a maximum if the space temperature becomes too high and to prevent any cooling of the air if the space temperature becomes too low, irrespective of the moisture content of the air.

2. In an air conditioning system for a space, in combination, a cooling coil, variably positionable motor means, means controlled thereby to lower the temperature of said coil, means responsive to the moisture content of the space to variably position said motor means, and a switch controlled by space temperature associated with said motor means operable to cause the same to maintain said coil at a predetermined temperature irrespective of the moisture content of the space if the space temperature becomes too high.

3. An air conditioning system of the class described, comprising, in combination, a cooling coil over which air to be conditioned is passed before delivering the same to a space to be controlled, compressor means for supplying refrigerant to said coil, an expansion valve in control of the flow of refrigerant to said coil, a throttling valve in the outlet conduit for said coil and in control of the refrigerant from said coil, motor means to variably position said throttling valve, means responsive to changes in moisture content in said space controlling said motor means to move said valve towards closed position as the humidity rises and vice versa, damper means arranged to by-pass air around said coil, motor means in control of said damper means, and a device controlled by the temperature in said space in control of said last-named motor means.

4. An air conditioning system for a space, comprising, a cooling coil for cooling the space, a compressor to supply refrigerant to said coil, a throttling valve in control of the flow of refrigerant from said coil, electric motor means in control of said valve, means responsive to the moisture content of the air in the space in control of said motor means to variably position the same upon fluctuations in the moisture content of the air in the space, and a switch controlled by the temperature of the space to position said motor means and therefore said throttling valve in a predetermined position upon rise in space temperature to a predetermined value.

5. An air conditioning system for a space, comprising, a cooling coil for cooling the space, a compressor to supply refrigerant to said coil, a throttling valve in control of the flow of refrigerant from said coil, means responsive to the relative humidity of the space in control of said throttling valve to variably position the same upon fluctuations in the space relative humidity, damper means to determine the effect of said cooling coil on the temperature of the space, motor means to variably position said damper means, space temperature responsive means to variably position said motor means, and means actuated by said motor means at a predetermined position thereof to additionally control said throttling valve.

6. In a moisture controlling system, in combination, a cooling coil to reduce the temperature of air passed thereover, compression means to supply refrigerant to said cooling coil, a throttling valve in control of the flow of refrigerant from said coil, a single motor means in control of said throttling valve, means responsive to the pressure in said coil in control of said motor means, and moisture responsive means to additionally control said motor means.

7. In an air conditioning system, in combination, a plurality of cooling coils, moisture responsive means to graduatingly vary the temperature of said cooling coils, and means responsive to temperature to determine the number of cooling coils to be placed in operation, and to also control the temperature of said coils.

8. An air conditioning system for a space, comprising, in combination, a plurality of cooling coils, a valve in control of each coil, variably positionable motor means in control of said valves to sequentially open the same, means responsive to the temperature of the space to position said motor means, a second variably positionable motor means in control of the cooling effect of said coils, space moisture responsive means in control of said second motor means, and means controlled by space temperature controlling said second motor means to lower the temperature of said coils if the space temperature becomes too high.

9. In an air conditioning system, in combination, a cooling coil to reduce the temperature of the air passed thereover, means to supply refrigerant to said cooling coil, means in control of the flow of refrigerant from the coil, a single motor in control of said last mentioned means, a single source of power for said single motor, means responsive to the pressure in the coil in control of the application of said power to said single motor, and temperature responsive means to additionally control the application of said power to said single motor.

10. In an air conditioning system, in combination, a cooling coil to reduce the temperature of the air passed thereover, means for supplying refrigerant to said coil, means for controlling the flow of refrigerant through said coil, a single motor in control of the last mentioned means, a single source of power for said single motor, means responsive to the pressure in the coil in control of the application of said power to said single motor, and moisture responsive means also in control of the application of power to said single motor.

11. In an air conditioning system, in combination, a cooling coil to reduce the temperature of the air passed thereover, means for supplying refrigerant to the coil, variable capacity means for reducing the back pressure on said coil, valve means for controlling the flow of refrigerant from the coil, said means being interposed between the coil and the back pressure reducing means, moisture responsive means in control of the valve means for graduatingly positioning the same, and means responsive to the pressure between said valve and back pressure reducing means for varying the capacity of said back pressure reducing means in accordance with fluctuations in such pressure.

12. An air conditioning system for a space comprising cooling means to lower the temperature of the air being conditioned, means responsive to the temperature of the space in control of the amount of air cooled by the cooling means, means responsive to the humidity of the space in control of the temperature of the cooling means, and means responsive to an increase in temperature in the space to a predetermined value for causing operation of the cooling means at a minimum temperature.

13. In an air conditioning system for a space, a plurality of cooling coils, individual electrically operated control valves for said coils, individual switches for said control valves, means for controlling the cooling effect of said coils, a first motor means for causing sequential actuation of said switches, a second motor means for controlling the cooling effect of said coils, and means responsive to the temperature humidity conditions of the space in control of one of said motor means and means responsive to one of said conditions in control of the other of said motor means.

14. In an air conditioning system, an air conditioning chamber for conditioning the air in a space, cooling means in said conditioning chamber, a variable capacity compressor means for circulating refrigerant through said cooling means, a plurality of control devices for controlling the capacity of said compressor means, motor means for controlling the operation of the control devices, means responsive to the temperature of the space being conditioned in control of said motor means, and means responsive to the humidity of the space in control of said motor means, whereby the capacity of the compressor means is varied according to the temperature and humidity of the air in the space.

15. In an air conditioning system, an air conditioning chamber for conditioning the air in a space, cooling means in said conditioning chamber, a variable capacity compressor means for circulating refrigerant through said cooling means, a plurality of control devices for controlling the capacity of the compressor means, motor means for controlling the operation of the control devices, means responsive ot the humidity in the space being conditioned for controlling the motor means whereby the capacity of the compressor means is increased in a series of steps as the humidity increases, and means responsive to the temperature of the space for causing operation of the motor means whereby the control devices cause high capacity operation of the compressor means regardless of the humidity in the space when the temperature therein is sufficiently high.

16. In an air conditioning system, an evaporator coil for cooling the air in a space, compressor means for supplying refrigerant to said coil, valve means controlling the flow of refrigerant from said coil to the suction side of said compressor means, means responsive to the pressure at the outlet of said evaporator coil for positioning said valve means in a manner to maintain a substantially constant pressure at the outlet of said evaporator coil, and means including a variable resistance, the resistance of which is gradually varied in response to changes in one of the conditions of the air for graduatingly adjusting the pressure which is maintained at the outlet of said evaporator coil by said pressure responsive means.

17. In an air cooling and dehumidifying apparatus, the combination of evaporator means, compressor means of variable capacity, condensing means, and means operable automatically to effect operation of the compressor means at full capacity and to supply a maximum portion of the evaporator means with liquid refrigerant to produce a low temperature therein in response to a predetermined maximum temperature and independently of humidity, to effect operation of the compressor means at reduced capacity and to supply a reduced portion of the evaporator means with liquid refrigerant to produce an intermediate temperature therein in response to a relatively low humidity and a temperature intermediate said predetermined maximum temperature and a predetermined minimum temperature, and normally to effect operation of the compressor means at a sufficiently high capacity to produce a relatively low evaporator means temperature and to supply a reduced portion of the evaporator means with liquid refrigerant in response to a relatively high humidity and a temperature intermediate said predetermined maximum temperature and a predetermined minimum temperature.

18. In a refrigerating system, the combination of a plurality of refrigerant evaporators, a plurality of compressor elements for supplying refrigerant to said evaporators, means for condensing the compressed refrigerant, means associated with the evaporators for respectively controlling the operation thereof, an electrical circuit, means influenced by a condition brought about by the operation of the controlling means for varying the value of a characteristic of the circuit, motor means including means responsive to said characteristic of the circuit, said motor means assuming positions corresponding to the value of said characteristic, means actuated upon movement of said motor means to a predetermined position for effecting operation of a portion of the compressor elements, means actuated upon movement of said motor means to a second predetermined position for effecting operation of a second portion of the compressor elements, and means actuated upon movement of said motor means to a third predetermined position for effecting operation of all of the compressor elements.

19. A system of the class described comprising, in combination, an evaporator coil for cooling air for a space to be conditioned, a compressor for supplying refrigerant to said evaporator, means in control of the flow of refrigerant through the evaporator including an expansion valve on the inlet side of said evaporator and a second valve positioned by the pressure on the outlet side of said evaporator, a control device responsive to the relative humidity of the space for additionally controlling the operation of said second valve, and means responsive to the temperature of the space for preventing control of said second valve by said humidity control upon increase in the space temperature to a predetermined value.

20. In an air conditioning system for a space, in combination, cooling means for the air comprising evaporator means and variable capacity compressor means for supplying refrigerant to said evaporator means, means actuated by suction pressure in control of said cooling means to maintain the suction pressure in the evaporator means substantially constant, means responsive to the moisture in the air of said space, means responsive to the temperature of said space, connections between one of said responsive means and said suction pressure actuated means for gradually adjusting the same to maintain lower suction pressures as the condition to which said responsive means responds rises, and connections between the other responsive means and said suction pressure actuated means for adjusting the same to maintain a low suction pressure irrespective of the action of said first-mentioned connections.

21. In an air conditioning system, in combination, a cooling coil to reduce the temperature of the air passed thereover, a direct expansion refrigeration system for supplying refrigerant to said cooling coil, means in control of the flow of refrigerant from the coil, a single motor means in control of said last mentioned means, means responsive to the pressure in the coil in control of the motor means, moisture responsive means responsive to the air being conditioned to additionally control said motor means, and means responsive to temperature for controlling said refrigerant flow controlling means irrespective of humidity when the space temperature varies to a predetermined value.

WAYLAND R. MILLER.